United States Patent
Pritchard et al.

(10) Patent No.: US 9,849,778 B2
(45) Date of Patent: Dec. 26, 2017

(54) MULTI-SPEED TRANSFER CASE

(71) Applicant: BorgWarner Inc., Auburn Hills, MI (US)

(72) Inventors: Larry A. Pritchard, Macomb, MI (US); Mallikarjun Rudagi, Auburn Hills, MI (US); William C. Dodge, Saline, MI (US); Sathya Vaidyanathan, Troy, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 79 days.

(21) Appl. No.: 14/887,428

(22) Filed: Oct. 20, 2015

(65) Prior Publication Data
US 2016/0121720 A1    May 5, 2016

Related U.S. Application Data

(60) Provisional application No. 62/073,610, filed on Oct. 31, 2014.

(51) Int. Cl.
*B60K 17/346*    (2006.01)

(52) U.S. Cl.
CPC ................ *B60K 17/3467* (2013.01)

(58) Field of Classification Search
CPC ............... B60K 17/3467; B60K 17/342
See application file for complete search history.

(56) References Cited

U.S. PATENT DOCUMENTS

| | | | | |
|---|---|---|---|---|
| 6,152,848 A | * | 11/2000 | Williams | B60K 17/3467 475/204 |
| 2003/0078130 A1 | * | 4/2003 | Williams | B60K 17/3467 475/204 |
| 2003/0119619 A1 | * | 6/2003 | Stephens | B60K 17/3467 475/207 |
| 2004/0220010 A1 | * | 11/2004 | Williams | B60K 17/3462 475/198 |
| 2005/0261100 A1 | * | 11/2005 | Haka | B60K 17/34 475/210 |
| 2010/0056313 A1 | * | 3/2010 | Lee | F16H 48/10 475/89 |
| 2013/0012352 A1 | * | 1/2013 | Oberaigner | B60K 17/3467 475/302 |
| 2016/0377156 A1 | * | 12/2016 | Robles | F16H 37/065 475/269 |

* cited by examiner

*Primary Examiner* — Erin D Bishop
*Assistant Examiner* — Lori Wu

(57) ABSTRACT

A transfer case of a motor vehicle drivetrain includes a planetary gear set including a ring gear to receive input torque, and a pinion assembly having pinion gears in mesh with the ring gear and a carrier to carry the pinion gears and transmit output torque. A sun gear is in mesh with the pinion gears, is selectively connectable to the carrier and rotatable therewith in a two-wheel drive mode and in a four-wheel-drive high range mode, and is selectively fixable against rotational motion in a four-wheel drive low range mode.

15 Claims, 4 Drawing Sheets

MULTI-SPEED TRANSFER CASE

TECHNICAL FIELD

The present disclosure relates generally to motor vehicle powertrains and, more particularly, to multi-speed transfer cases.

BACKGROUND

A motor vehicle powertrain includes a prime mover to generate torque, a transmission coupled to the prime mover to leverage the torque, and a drivetrain coupled to the transmission to distribute the torque to wheels of the vehicle. For example, the drivetrain of some vehicles includes a transfer case to carry out changes from a two-wheel-drive (2WD) mode to a four-wheel-drive (4WD) mode and vice versa, or changes from a high range 4WD mode to a low range 4WD mode and vice versa.

An example of a multi-speed transfer case includes a housing, an input to receive torque, an output to transmit torque, and a planetary gear set between the input and the output. The gear set includes a helical sun gear connected to the input, a planetary carrier connected to the output and carrying helical pinion gears in mesh with the sun gear, and a helical ring gear in mesh with the pinion gears and grounded to the housing. A method of operating the transfer case includes driving torque in to the sun gear, connecting the sun gear to the output in a two-wheel drive mode and in a four-wheel-drive high range mode to drive torque out of the sun gear according to a direct drive ratio, and connecting the carrier to the output in a four-wheel drive low range mode to drive torque out of the carrier according to an under drive ratio of about 2.64.

SUMMARY

In one embodiment, a motor vehicle transfer case includes an input to receive torque, an output to transmit torque, and a planetary gear set between the input and the output. The gear set includes a ring gear connected to the input, and a pinion assembly connected to the output and including pinion gears in mesh with the ring gear and a carrier to carry the pinion gears. The gear set also includes a sun gear in mesh with the pinion gears, selectively connectable with the carrier to rotate with the carrier in two-wheel drive and four-wheel-drive high range modes, and selectively groundable against rotation in a four-wheel-drive low range mode.

In another embodiment, a transfer case of a motor vehicle drivetrain includes a planetary gear set, including a ring gear to receive input torque, and a pinion assembly having pinion gears in mesh with the ring gear and a carrier to carry the pinion gears and to transmit output torque. The gear set also includes a sun gear in mesh with the pinion gears, selectively connectable to the carrier in a two-wheel drive mode and in a four-wheel-drive high range mode, and selectively fixable against rotational motion in a four-wheel drive low range mode.

DETAILED DESCRIPTION

Figure 1:
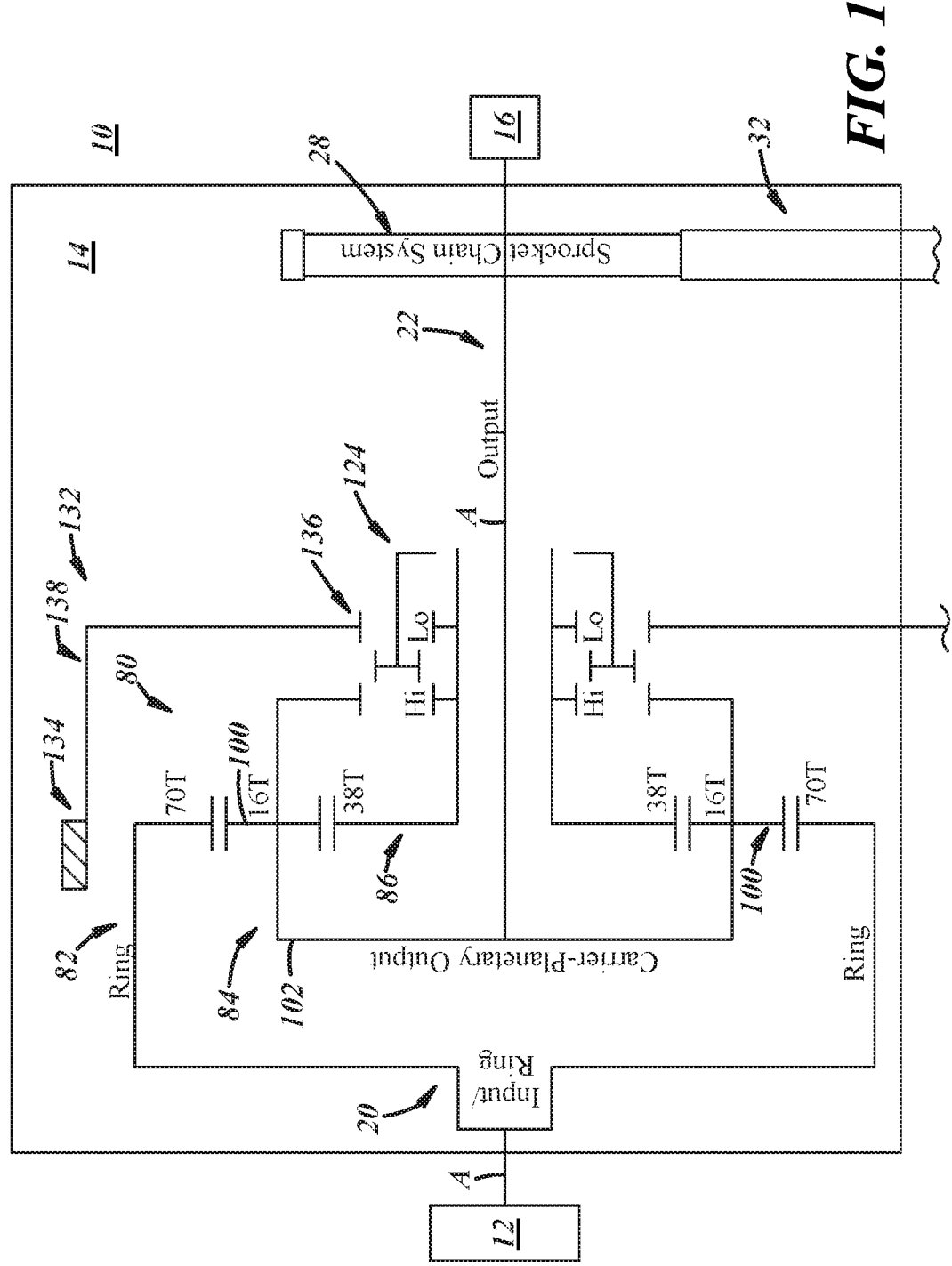
FIG. 1 is a mechanical schematic diagram of a portion of a vehicle powertrain in accord with an example embodiment of the present disclosure.

The drawing figures illustrate embodiments of a transfer case 14 equipped with one or more unique and inventive arrangements of components that may result in less cost, improved robustness, and greater performance in vehicle noise, vibration, and harshness (NVH). This is because the planetary gears do not rotate in two-wheel drive and four-wheel-drive high range modes and, consequently, those gears need not be helical gears (which typically are used to reduce gear noise) and, instead, may be spur gears. Also, a lower ratio provided by the transfer case 14 may enable increased vehicle speeds in the four-wheel-drive low range mode. More specifically, in contrast to a typical transfer case having an under drive ratio of 2.64, here the transfer case 14 provides a lower under drive ratio, for example, 1.5 to 1.55. This lower ratio allows for higher speeds in low range mode and results in a smaller ratio step between high and low range modes. Accordingly, on an off-road course, a truck equipped with the transfer case 14 may go faster than a truck equipped with the typical transfer case.

With reference to FIG. 1, in general, a motor vehicle powertrain 10 may include a transmission 12, a transfer case 14 coupled to the transmission 12, and an axle 16 coupled to the transfer case 14. Of course, although not shown, the powertrain 10 also may include another differential, a prime mover, such as an engine or motor, and any other suitable powertrain elements. The transmission 12 may include a manual transmission, a multi-speed automatic transmission, a continuously/infinitely variable transmission, and/or any other suitable type of transmission to leverage torque provided to the transmission by the prime mover. Likewise, the axle(s) 16 may include differentials, all-wheel-drive (AWD) couplings, or any other suitable drivetrain elements.

Figure 2:
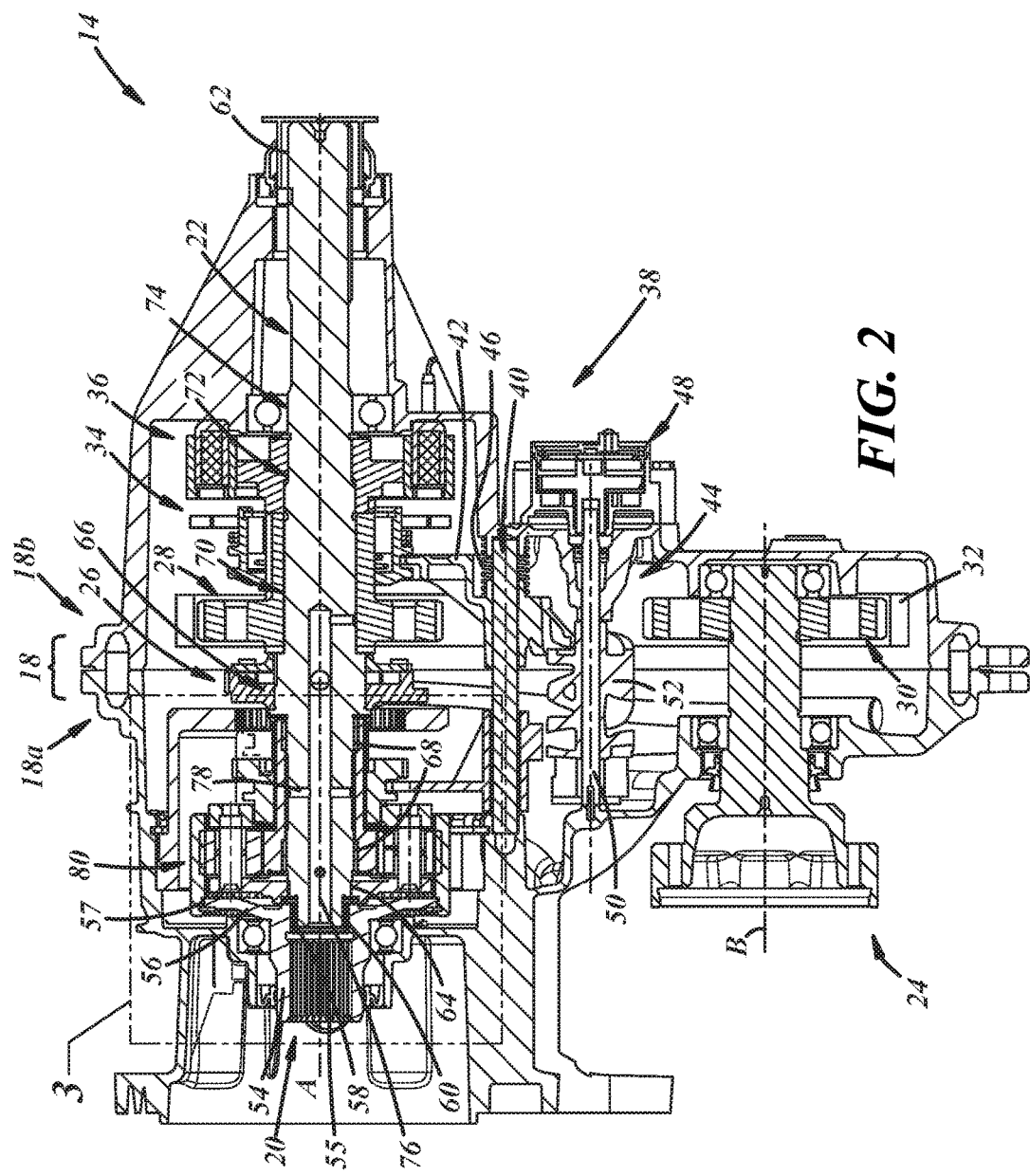
FIG. 2 is a fragmentary cross-sectional view of a transfer case of the powertrain of FIG. 1.

With reference to FIGS. 1 and 2, the transfer case 14 may carry out changes from a two-wheel-drive (2WD) mode to a four-wheel-drive (4WD) mode and vice versa, changes from a high range 4WD mode to a low range 4WD mode and vice versa, and/or any other suitable transfer case functionality. The transfer case 14 may include a housing 18 (FIG. 2) to carry various transfer case components, an input 20 rotatable about a first axis A to receive torque, a first output 22 also rotatable about the first axis A to transmit torque out of the transfer case 14, and a second output 24 (FIG. 2) rotatable about a second axis B offset from the first axis A to transmit torque out of the transfer case 14 in a direction different from that of the first output 22. Furthermore, the transfer case 14 may include an oil pump assembly 26 that may be connected to the first output 22 to pull oil from the bottom of the housing 18 and distribute the oil to various parts of the transfer case 14. Also, the transfer case 14 may include a first sprocket 28 selectively connectable to the first output 22, a second sprocket 30 (FIG. 2) connected to the second output 24, and a chain 32 connected to the first and second sprockets 28, 30 to carry torque from the first axis A to the second axis B.

With reference to FIG. 2, the transfer case 14 further may include a shiftable coupling 34 to selectively connect the first sprocket 28 to the first output 22, and a synchronizer 36 to synchronize the speed of the first sprocket 28 and the first output 22 to facilitate connection thereof. Additionally, the transfer case 14 may include a shift actuator arrangement 38 that shifts the shiftable coupling 34 and that may include a shift rail 40 carried by the housing 18, a shift fork 42 slidably carried on the shift rail 40 and engaged with the shiftable coupling 34, a shift fork transmission 44 engaged with the shift fork 42 to move the shift fork 42 into an engagement position, and a spring 46 to move the shift fork 42 to a disengagement position. The shift fork transmission 44 may include an actuator 48, a transmission shaft 50 coupled to the actuator 48, and a fork driver 52 carried on the transmission shaft 50 to rotate and drive the shift fork 42 when the actuator 48 rotates the shaft 50. Moreover, the transfer case 14 may include various bearings, washers, seals, gaskets, pins, fasteners, and any other suitable components.

The housing 18 may include multiple housing portions, for example, first and second opposed housing portions 18a, 18b that may be coupled together via dowel pins and fasteners, or in any other suitable manner. In other embodiments, the housing 18 may be a single monolithic structure, such as a casting, to which one or more covers (not shown), such as stampings, may be attached. In any case, the housing 18 may provide structural support for various internal components of the transfer case 14.

The input 20 may include an input hub 54 and flange 56, as illustrated, or may include an input shaft, an input plate, an input ring, and/or any other component(s) suitable to carry torque output received by the transfer case 14 from the transmission 12 (FIG. 1). In the illustrated example, the input 20 includes an internal spline 55 in the hub 54 at a first end, and an external spline 57 on the flange 56 at a second end. In other embodiments, although not shown, the input 20 could include an external spline at the first end, lugs at the second end, or any other suitable arrangement of connection features. In any case, the input 20 may be splined, and may include a bearing journal 58 that is located at the second end and that may be an internal feature to support the output 22.

Likewise, the output 22 may include an output shaft, as illustrated, or may include an output hub and flange, or any other component(s) suitable to carry torque out of the transfer case 14 to a downstream drivetrain element, for example, a driveshaft and/or the axle 16 (FIG. 1). In the illustrated example, the output 22 may include a bearing journal 60 that is located at a first end of the output 22 and that may be an external feature, for cooperation with the corresponding bearing journal 58 of the input 20 via a bushing or bearing. The output 22 also may include an output spline 62 at a second end, a carrier spline 64 proximate the first end and the bearing journal 60, a pump journal and spline portion 66, and one or more sun gear journals 68 between the pump journal and spline portion 66 and the carrier spline 64. The output 22 further may include a sprocket journal 70 between the pump journal and spline portion 66 and the output spline 62, a sprocket coupling spline and journal portion 72 between the sprocket journal 70 and the output spline 62, and another bearing journal 74 proximate the output spline 62. Also, the output 22 may include a main oil passage 76 extending axially into the first end of the output 22, and a transverse oil passage 78 between the sun gear journals 68 and in fluid communication with the main oil passage 76.

Figure 3:
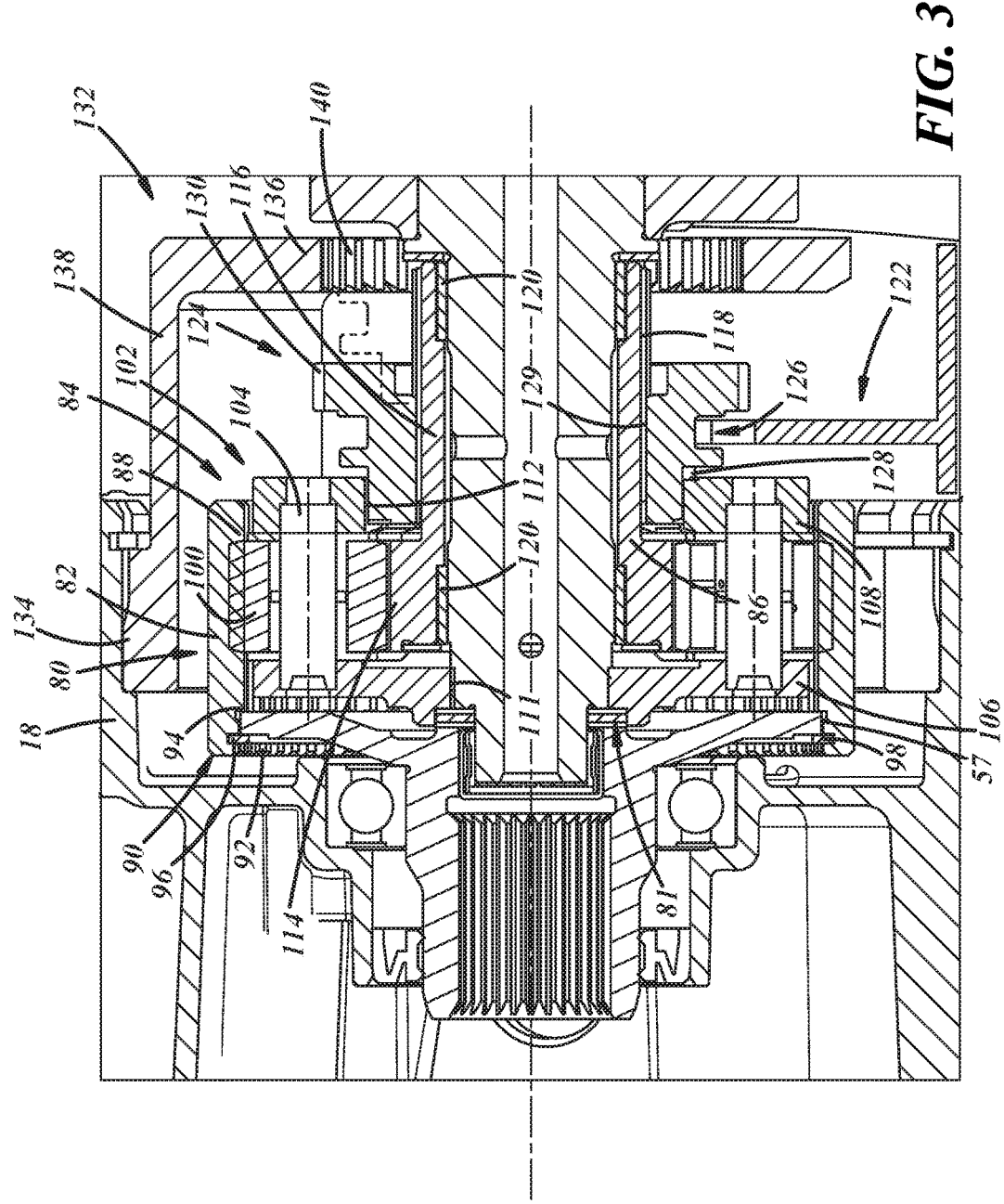
FIG. 3 is an enlarged fragmentary cross-sectional view of a portion of the transfer case of FIG. 2.
Figure 4:
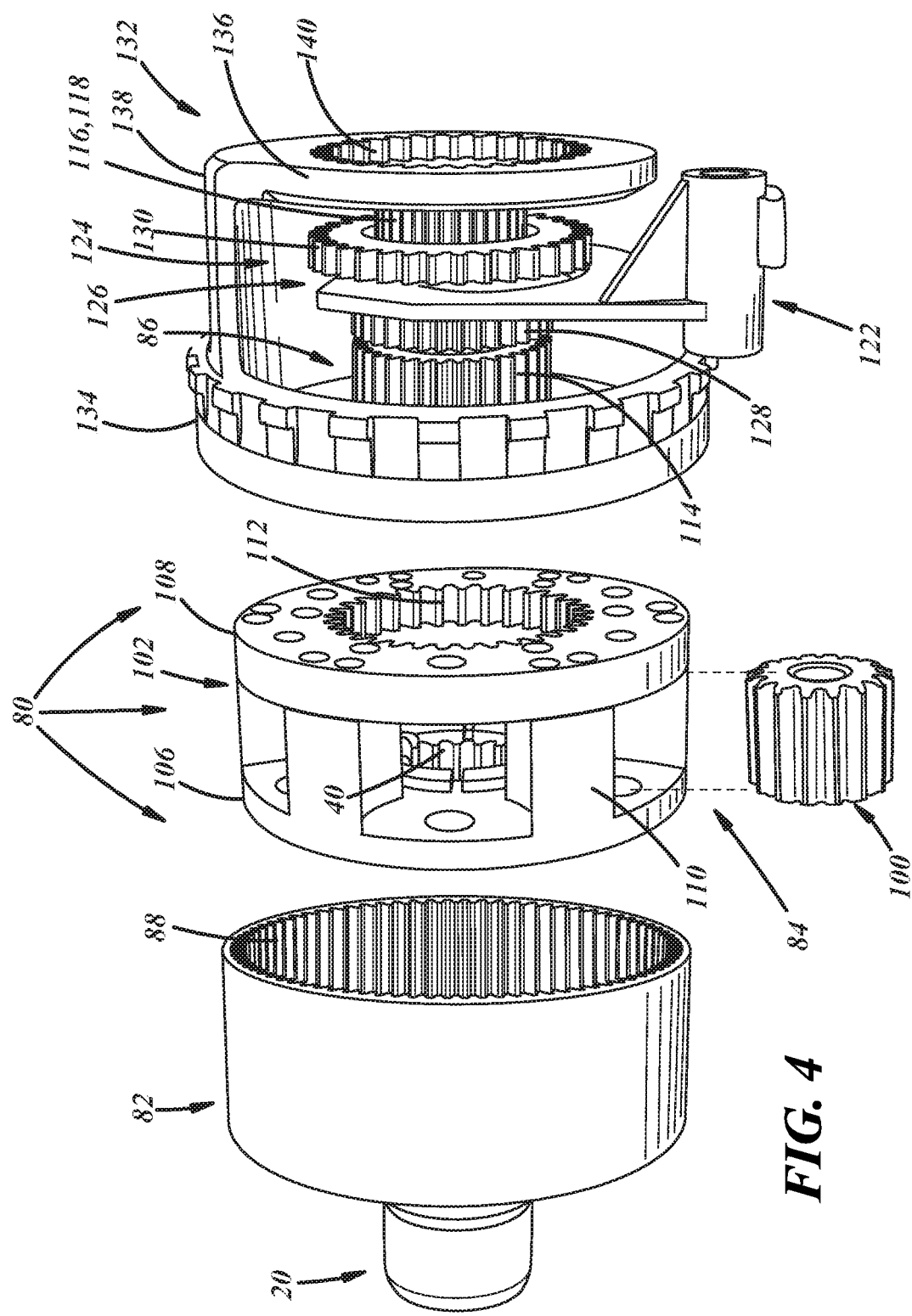
FIG. 4 is an enlarged, exploded view of a planetary gear set and a shift ring of the portion of the transfer case of FIG. 3.

With reference to FIGS. 3 and 4, the transfer case 14 also includes a planetary gear set 80 for carrying and/or leveraging torque that is received by the transfer case 14. The planetary gear set 80 is positioned between the input 20 and the output 22 of the transfer case 14 and may be rotatably supported by and carried on the output 22. A thrust bearing 81 may be positioned between a second end of the input 20 on one side, and a first end of the planetary gear set 80 on an opposite side. The gear set 80 includes a ring gear 82 connected to the input 20, and a pinion assembly 84 connected to the output 22. The planetary gear set 80 also includes a sun gear 86 that is selectively connectable with the pinion assembly 84 in a two-wheel drive mode and in a four-wheel-drive high range mode. The sun gear 86 also is selectively fixable against rotational motion, such that the pinion assembly 84 is rotatable around the sun gear 86, in a four-wheel drive low range mode. In one example, as illustrated, the sun gear 86 may be selectively groundable, for example, to the housing 18, in a four-wheel-drive low range mode.

With reference to FIG. 3, the ring gear 82 may include gear teeth 88, an input end 90, an internal spline 92, a shoulder 94 between the input end 90 and the gear teeth 88, and a snap ring groove 96 between the shoulder 94 and the input end 90. Accordingly, the external spline 57 of the input flange 56 may be splined to the internal spline 92 of the ring gear 82 and trapped between the shoulder 94 and a snap ring 98. The ring gear 82 may include seventy-eight gear teeth, or any other suitable quantity of gear teeth.

The pinion assembly 84 includes pinion gears 100 in mesh with the ring gear 82 and with the sun gear 86, and a carrier 102 to carry the pinion gears 100. The pinion assembly also may include pinion shafts 104 to couple the pinion gears 100 to the carrier 102, and also may include needle bearings between the pinion shafts 104 and the pinion gears 100 and washers between the pinion gears 100 and the carrier 102. In one example, the assembly 84 may include six of the pinion gears 100, or three, or four, or any other suitable quantity of the pinion gears 100. In any case, the pinion gears 100 may have sixteen gear teeth, or any other suitable quantity of gear teeth.

With reference to FIGS. 3 and 4, the carrier 102 may include first and second plates 106, 108 that may be coupled together via the pinion shafts 104 (FIG. 3), and also may be coupled via extensions 110 (FIG. 4) extending axially between the plates 106, 108. The extensions 110 may be separate components or may be integral with one or both of the plates 106, 108, and may be welded, fastened, or otherwise coupled in any suitable manner to respective portions of the carrier 102. The carrier plates 106, 108 may be stampings, forgings, castings, machined from solid stock, or produced in any other suitable manner. In other embodiments, the carrier plates 106, 108 may be integral with one another, such as portions of a single casting. In any case, the carrier 102 may be splined. For instance, the carrier 102 may include a first internal spline 111, for example, on the first plate 106, to connect the carrier 102 to the carrier spline 64 of the output 22 (FIG. 3). Also, the carrier 102 may include a second internal spline 112, for example, on the second plate 108, as will be discussed in greater detail below. The diameter of the second internal spline 112 may be greater than the diameter of the first internal spline 111.

The sun gear 86 may include a gear portion 114 at a first end in mesh with the pinion gears 100, and a splined hub 116 at a second end and having external splines 118 as will be discussed in greater detail below. The sun gear 86 also may include one or more bushings 120 (FIG. 3) carried in the first and second ends of the sun gear 86 for support on the sun gear journals 68 of the output 22 (FIG. 3). The sun gear 86 may include thirty-eight gear teeth, or any other suitable quantity of gear teeth.

The transfer case 14 also may include a shift fork 122 and corresponding shift ring 124 to selectively couple and uncouple portions of the planetary gear set 80 to one another or a portion of the planetary gear set 80 to the housing 18 (FIG. 3). The shift ring 124 may be axially slidably carried along and non-rotatably coupled to the sun gear 86. Also, the shift ring 124 may be selectively connectable with the carrier 102 to render the sun gear 86 rotatable with the carrier 102, and may be selectively groundable to render the sun gear 86 stationary with respect to the carrier 102 and render the carrier 102 rotatable around the sun gear 86. The shift ring 124 may include a first end, a second end axially opposite the first end, and a shift fork coupling portion 126 therebetween. Also, the shift ring 124 may be splined. For example, the shift ring 124 may include a first spline 128 at the first end, a second spline 130 at the second end that may be larger in diameter than the first spline 128, and an internal spline 129 (FIG. 3) for slidable but non-rotatable connection to the external splines 118 of the sun gear 86. The splines 128, 130 may be external splines, as illustrated. The shift fork 122 may be carried on the shift rail 40 and may be driven by the fork driver 52 of the shift fork transmission 44.

The transfer case 14 further may include a separate grounding structure 132 carried within, and fixed against rotation to, the housing 18 (FIG. 3). The shift ring 124 may be selectively connectable to the grounding structure 132 but, as illustrated, the shift ring 124 may not be simultaneously connectable to both the carrier 102 and to the grounding structure 132. The grounding structure 132 may include a grounding ring 134 that may be splined or otherwise non-rotatably carried by the housing 18, a reaction ring 136 to connect to the shift ring 124, and an extension 138 extending between the grounding ring 134 and the reaction ring 136. The extension 138 may be semi-cylindrical so as to not interfere with the shift fork 122. The reaction ring 136 may be splined, for example, to include an internal spline 140 to receive the second spline 130 of the shift ring 124. In other embodiments, the reaction ring 136 and the grounding ring 134 may be one and the same without any need for the extension 138, for example, where a transfer case housing is sufficiently circumferentially complete to provide suitable engagement and support for such a ring.

In operation, and with reference to FIGS. 2 and 3, the shift ring 124 may be driven by the shift fork transmission 44 when adjusting the transfer case 14 from one mode to another. For example, the shift ring 124 may be in a first position, as illustrated with solid lines, in the 2WD mode and in the 4WD high range mode, and may be shifted to a second position, as illustrated with phantom lines, in a 4WD low range mode, and vice-versa. In the first position, the sun gear 86 is selectively connected to the carrier 102 of the pinion assembly 84 to lock up the planetary gear set 80 in the two-wheel drive mode and in the four-wheel-drive high range mode. In the second position, the sun gear 86 is selectively fixed against rotational motion in the four-wheel drive low range mode. In the first position, torque is driven through the input 20 into the planetary gear set 80 through the ring gear 82, and out of the locked up planetary gear set 80 through the carrier 102 to the output 22. In the second position, torque is driven through the input 20 into the planetary gear set 80 through the ring gear 82, against the fixed sun gear 86, through the pinion gears 100 into the carrier 102, and out of the planetary gear set 80 through the carrier 102 to the output 22. Accordingly, the sun gear 86 being connected to the carrier 102 results in a direct drive ratio between the input 20 and the output 22, whereas the sun gear 86 being fixed results in an under drive ratio between the input 20 and the output 22. The under drive ratio may be 1.5 to 1.55 and may include all ranges, subranges, and values therebetween and inclusive, for example, and not limited to 1.51 and 1.54.

The transfer case 14 may exclude various components previously required in prior art transfer cases. For example, the transfer case 14 may exclude a wet multi-disc clutch and/or synchronizer couplings typically used to selectively engage and disengage portions of a planetary gear set. In another example, the transfer case 14 may exclude a ring gear grounded to the housing 18.

The foregoing description is considered illustrative only. The terminology that is used is intended to be in the nature of words of description rather than of limitation. Many modifications and variations will readily occur to those skilled in the art in view of the description. Thus, the foregoing description is not intended to limit the invention to the embodiments described above. Accordingly the scope of the invention as defined by the appended claims.

What is claimed is:
1. A motor vehicle transfer case, comprising:
an input to receive torque;
an output to transmit torque; and
a planetary gear set between the input and the output, and including:
a ring gear connected to the input,
a pinion assembly connected to the output and including pinion gears in mesh with the ring gear and a carrier to carry the pinion gears, and
a sun gear in mesh with the pinion gears, selectively connectable with the carrier to rotate with the carrier in a two-wheel drive mode and in a four-wheel-drive high range mode, and selectively groundable against rotation in a four-wheel-drive low range mode.
2. The transfer case of claim 1, further comprising:
a shift ring axially slidably carried along and non-rotatably coupled to the sun gear, selectively connectable with the carrier to render the sun gear rotatable with the carrier, and selectively groundable to render the sun gear stationary with respect to the carrier and render the carrier rotatable around the sun gear.
3. The transfer case of claim 2, further comprising:
a housing; and
a separate grounding structure carried within, and fixed against rotation to, the housing, wherein the shift ring is selectively connectable to the grounding structure to ground the sun gear.
4. The transfer case of claim 3, wherein the shift ring is not simultaneously connectable to both the carrier and to the separate grounding structure.
5. The transfer case of claim 3, wherein the grounding structure includes a grounding ring splined to the housing, a splined reaction ring to connect to the shift ring, and an extension extending between the grounding ring and the splined reaction ring.
6. The transfer case of claim 5, wherein the shift ring includes an external spline, and the splined reaction ring includes an internal spline that receives the external spline of the shift ring.
7. The transfer case of claim 1, wherein the pinion gears are spur gears, not helical gears.
8. A motor vehicle powertrain, comprising:
a transmission providing a plurality of transmission gear ratios; and
the transfer case of claim 1, which has the input coupled to the transmission and which provides a direct drive ratio in the two-wheel-drive and four-wheel-drive high range modes, and an underdrive ratio in the four-wheel-drive low range mode.

9. A transfer case of a motor vehicle drivetrain, comprising:
   a planetary gear set, including:
      a ring gear to receive input torque,
      a pinion assembly having pinion gears in mesh with the ring gear and a carrier to carry the pinion gears and to transmit output torque, and
      a sun gear in mesh with the pinion gears, selectively connectable to the carrier to rotate with the carrier in a two-wheel drive mode and in a four-wheel-drive high range mode, and selectively fixable against rotational motion in a four-wheel drive low range mode.

10. The transfer case of claim 9, further comprising a shift ring having an internal spline in engagement with an external spline of the sun gear and slidable along the sun gear to selectively connect the sun gear to the carrier.

11. The transfer case of claim 10, wherein the shift ring has an external spline connectable with an internal spline of the carrier.

12. The transfer case of claim 9, wherein the sun gear is selectively groundable to a housing of the transfer case.

13. The transfer case of claim 9, further comprising a shift ring wherein the shift ring has an external spline connectable with an internal spline of a reaction ring fixed to a housing against rotational motion.

14. The transfer case of claim 9, wherein the sun gear being connected to the carrier results in a direct drive ratio between the input and the output, whereas the sun gear being fixed against rotational motion results in an under drive ratio between the input and the output.

15. The transfer case of claim 14, wherein the underdrive ratio is 1.5 to 1.55.

* * * * *